(12) United States Patent
Olson et al.

(10) Patent No.: US 6,644,600 B1
(45) Date of Patent: Nov. 11, 2003

(54) METHOD AND SYSTEM FOR PROVIDING MANIPULATION RESTRAINING FORCES FOR A STICK CONTROLLER ON AN AIRCRAFT

(75) Inventors: Thomas C. Olson, Cedar Rapids, IA (US); E. Bernard Hayes, Cedar Rapids, IA (US); M. Scott Ervin, Lisbon, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 0 days.

(21) Appl. No.: 10/132,839

(22) Filed: Apr. 25, 2002

(51) Int. Cl.[7] ............................................. B64C 13/04
(52) U.S. Cl. ...................... 244/221; 244/223; 244/230; 244/236
(58) Field of Search ................... 244/236, 223, 244/230, 178, 221, 226, 227, 228, 195, 196, 75 R, 229; 74/471; 318/675, 564, 628, 676

(56) References Cited

U.S. PATENT DOCUMENTS

| 4,477,043 A | * | 10/1984 | Repperger ................... 244/223 |
| 4,717,098 A | * | 1/1988 | Walker et al. .............. 244/223 |
| 5,002,241 A | * | 3/1991 | Tizac ......................... 244/223 |
| 5,125,602 A | * | 6/1992 | Vauvelle ..................... 244/223 |
| 5,900,710 A | * | 5/1999 | Gautier et al. .............. 244/223 |

OTHER PUBLICATIONS

Marconi Electronic Systems, brochure entitled "Fly–By–-Wire Pilots Inceptors".

* cited by examiner

Primary Examiner—Galen L. Barefoot
(74) Attorney, Agent, or Firm—Nathan O. Jensen; Kyle Eppele

(57) ABSTRACT

A system and method for providing variable motion-resisting loads for a side stick controller on an aircraft where the primary resistive load is provided by a mechanical spring mechanism which is augmented or supplemented by an electric servo motor and electric servo motor linkage system.

18 Claims, 1 Drawing Sheet

METHOD AND SYSTEM FOR PROVIDING MANIPULATION RESTRAINING FORCES FOR A STICK CONTROLLER ON AN AIRCRAFT

FIELD OF THE INVENTION

The present invention generally relates to aircraft, and more particularly relates to flight control systems, and even more particularly relates to methods and systems for implementing a motion-resisting load on a stick control on an aircraft.

BACKGROUND OF THE INVENTION

In recent years, more and more aircraft are provided with side stick controllers instead of the traditional yoke and wheel arrangement. These side stick controllers are even more common in aircraft which employ a fly-by-wire system. It is common to have multiple side sticks in the cockpit. Typically, these side sticks provide some resistance to the pilot's manipulation of the stick. In some implementations, spring loads, which are arranged in orthogonal directions, are used to provide a resistance to the pilot's manipulation of or other motion of the side stick. Other implementations have used electric motors with drive servos to supply the resistance to motion of the side stick. Due to the need for extremely high integrity of flight control systems, these electric motors are usually provided in double or triple redundant arrangements.

While these double and triple redundant side stick loads have been used extensively in the past, they do have some drawbacks. First of all, the cost of providing this redundancy is often prohibitive, especially for smaller general aviation aircraft. The double and triple redundant systems also consume valuable space in and provide additional weight to a cockpit.

Consequently, there exists a need for improved methods and systems for providing side stick motion resisting loads in an efficient manner.

SUMMARY OF THE INVENTION

It is an object of the present invention to provide a system and method for providing a load for resisting motion of a side stick controller in an efficient manner.

It is a feature of the present invention to utilize an electric motor deployed to augment resistive load forces provided by a spring load.

It is another feature of the present invention to include a plurality of motion-resisting load springs disposed about a side stick.

It is an advantage of the present invention to achieve an electrically variable load without a need for redundant electric motors.

The present invention is an apparatus and method for providing a variable load to resist motion of a side stick, designed to satisfy the aforementioned needs, provide the previously stated objects, include the above-listed features, and achieve the already articulated advantages. The present invention is carried out in a "wasted space-less and wasted weight-less" manner in a sense that the wasted space consumed and the wasted weight incurred by multiple redundant electric motors for providing a motion-resisting load on a side stick, have been greatly reduced.

Accordingly, the present invention is a system and method including a side stick controller with a spring load for providing primary resistance to motion of the side stick and an electric motor configured to augment the primary resistive forces provided by the spring load.

BRIEF DESCRIPTION OF THE DRAWINGS

The invention may be more fully understood by reading the following description of the preferred embodiments of the invention, in conjunction with the appended drawing wherein.

DETAILED DESCRIPTION

Figure 1:
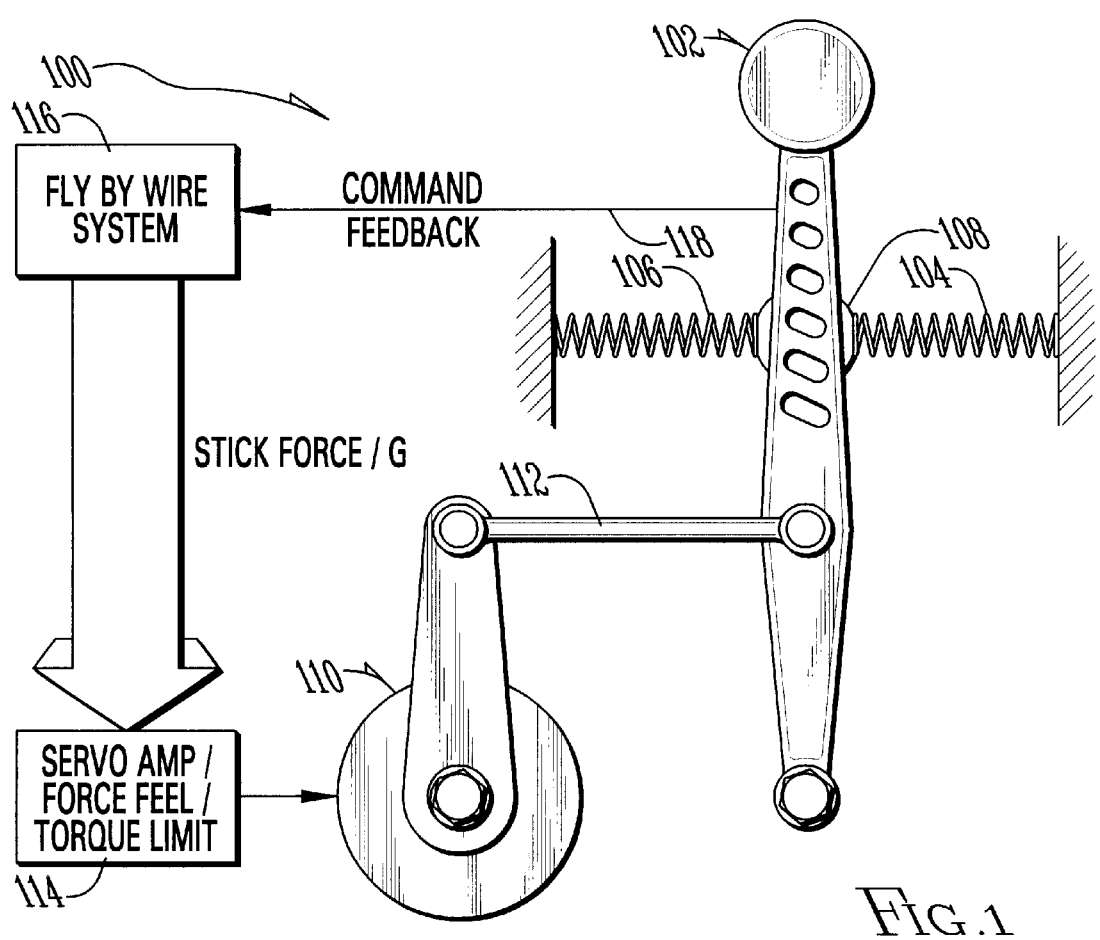
FIG. 1 is a simplified block diagram view of a system of the present invention.

Now referring to the drawing, there is shown a system of the present invention generally designated 100, including a side stick controller 102, which could be any type of joystick controller in an aircraft. Side stick controller 102 could be used by a pilot or a co-pilot or other member of a flight crew. The function of the side stick controller 102, namely, to provide a man-machine interface through which a pilot controls an aircraft, is well known in the art. Side stick controller 102 is preferably capable of moving within a predetermined conical zone, centered about a vertical central line. Side stick controller 102 is coupled to a first motion resisting spring load 104, which provides a load-resisting force to the side stick controller 102. Similarly, second motion-resisting spring load 106 and orthogonal motion-resisting spring load 108 are included to provide a motion-resisting load. The arrangement of side stick controller 102, first motion-resisting spring load 104, second motion-resisting spring load 106, orthogonal motion-resisting spring load 108, and any other spring loads, is a matter of design choice. These springs can be identical springs, or they may be different so as to compensate for differences in the forces applied by the pilot. For example, a typical person will provide more force with pronation than with a rotation of the hand so as to cause the palm to be oriented upwardly. However, it should be understood that numerous variations of side sticks, which are exclusively spring biased, are well known in the art.

Also shown in the figure is electric servo motor 110, which can be any type of motor, such as a DC or a stepper motor or any suitable motor or other device capable of providing resistive forces to the side stick controller 102 in response to an input electrical control signal. Electric servo motor 110 may be coupled to side stick controller 102 via electric servo motor linkage 112, which can be any suitable type of linkage. The forces applied by electric servo motor 110 and electric servo motor linkage 112 may be tailored, depending upon flight characteristics. For example, an increasingly heavy resistive load is known to be desirable with increasing airspeed. This may be done to mimic the increasingly necessary forces which would be needed when control surfaces of an accelerating aircraft were manipulated using traditional mechanical means. In some applications, it is also desirable to have cross-cockpit linking of the pilot's side stick and the co-pilot's side stick. Still other reasons for having variable forces applied to a side stick are also well known in the prior art.

Electric servo motor linkage 112 may be similar to the linkage used in prior art side sticks which employ multiple redundant electric motors, etc. or the like. However, one beneficial aspect of the present invention is that the electric servo motor 110 and electric servo motor linkage 112 may preferably be providing less force than would be applied by a prior art resistive load system which was purely driven by electric motors and servos, etc.

Electric servo motor 110 is driven by electric servo amplifier 114, which can provide the drive control signals to electric servo motor 110 by which the side stick controller with electric augmentation of motion-resisting loads 100 operates with predetermined characteristics of force feel and torque limits. In general, the electric servo motor 110 is used to augment the forces applied by the spring loads and not to replace those springs and their associate resistive forces. Electric servo amplifier 114 is responsive to control signals provided by fly-by-wire system 116. It should be understood that the side stick controller with electric augmentation of motion-resisting loads 100 of the present invention need not be limited to use with fly-by-wire systems and may be employed with traditional mechanical systems as well. The fly-by-wire system 116 merely represents what is believed to be the environment where the present invention will be the most beneficial. Fly-by-wire system 116 is responsive to side stick feedback loop 118, which could be providing feedback relating to the position of side stick controller 102 and/or the force being applied on side stick controller 102 by the flight crew. The mechanisms which provide the side stick feedback loop 118 information are well known in the art, and they may be simple force sensors in the side stick controller 102 or rotary variable differential transformers (RVDTs), syncros or other well-known arrangements.

In operation, the apparatus and method of the present invention as described in the figure, could function as follows:

The pilot or other member of the crew can attempt to manipulate the side stick controller 102. This attempted manipulation is opposed by a resistive force, which is primarily provided by the first motion-resisting spring load 104, second motion-resisting spring load 106, orthogonal motion-resisting spring load 108 and another orthogonal spring (not shown). If the fly-by-wire system 116 and the electric servo amplifier 114 command a force different that that provided by the springs, then the electric servo motor 110 and electric servo motor linkage 112 will augment or supplement the spring forces to arrive at the desired level of force on the side stick controller 102 for a given stick position and/or to command the side stick controller 102 to a desired position or orientation. These supplemental or augmenting forces provided by the electric servo motor 110 can be varied, depending upon the system requirements and design. The fly-by-wire system 116 provides control signals to the electric servo amplifier 114 in response to feedback from side stick feedback loop 118. Many of the advantages of a prior art electric resistive force system, with multiple redundant motors and servos, are achieved by the use of augmenting electric servo motor 110. However, the need for multiple redundancy is eliminated because if a spring were to break, the electrical augmenting electric servo motor 110 can provide additional force. In the event that the electrical augmentation were to fail first, the system reverts to being biased by the mechanical spring system. While some of the features of the electrical resistive load systems, such as cross-cockpit linking of multiple side stick would be lost in such failure modes, the primary function of resisting the manipulation of the side stick remains functional. It should be noted that real time variable resistance forces would be lost in one side stick, but not necessarily in the other side stick when an electric servo motor 110 or other component were to fail in just one of the side stick controllers with electric augmentation of motion- resisting loads on-board the aircraft.

Throughout this description, reference is made to side sticks and to airplane control surfaces, because it is believed that the beneficial aspects of the present invention would be most readily apparent when used in connection with airplanes having multiple stick controllers, located alongside the pilot; however, it should be understood that the present invention is not intended to be limited to airplanes and side-mounted control sticks, and should be hereby construed to include other aircraft, such as helicopters and center-mounted control sticks as well. The system could be used for other vehicles and vessels as well and for non-vehicular or non-vessel applications as well, such as munitions guidance, video games or any joystick-type controller.

It is thought that the method and apparatus of the present invention will be understood from the foregoing description and that it will be apparent that various changes may be made in the form, construct steps, and arrangement of the parts and steps thereof, without departing from the spirit and scope of the invention or sacrificing all of their material advantages. The form herein described is merely a preferred exemplary embodiment thereof.

We claim:

1. A method of resisting motion of a stick handle of a control stick comprising the steps of:
   providing plurality of springs configured for providing a spring bias against said stick handle; and,
   providing a supplementing force to resist a pilot manipulation of said stick, where said supplementing force is in addition to said spring bias and where said supplementing force is accomplished with an electrically controllable force.

2. A method of claim 1 wherein said spring bias is the primary source of resistive force on said stick handle.

3. A flight control system comprising:
   a first side stick controller configured for providing control of a flight characteristic of an aircraft in response to manipulation by a pilot;
   spring means for providing resistance to motion of said first side stick controller in response to said manipulation by a pilot;
   electrical means for providing variable resistance to motion of said first side stick controller in response to said manipulation by a pilot; and
   said electrical means for providing resistance provides a supplementing force which supplements forces being applied by said spring means.

4. A flight control system of claim 3 wherein said spring means provides a primary source of resistive force on said first side stick controller.

5. A flight control system of claim 4 wherein said spring means includes at least two springs which are orthogonal with respect to each other.

6. A flight control system of claim 5 wherein said electrical means comprises:
   an electric servo motor; and,
   an electric servo motor linkage disposed between said electric servo motor and a handle of said first side stick controller.

7. A flight control system of claim 6 further comprising:
   an electric servo amplifier; and
   a source of control signals for providing control signals to said electric servo amplifier.

8. A flight control system of claim 7 further comprising:
   a side stick feedback loop configured to provide variable force versus displacement characteristics of said handle of said first side stick controller.

9. A flight control system of claim 8 wherein said feedback loop is responsive to a position of said handle.

10. A flight control system of claim 9 wherein said feedback loop is responsive to a force applied on said handle.

11. A flight control system of claim 4 further comprising:

a second side stick controller which is configured to at least partially track a position of said first side stick controller, thereby providing one member of a flight crew with both a visual and tactile indication of movement of a side stick controller by another member of the flight crew.

12. A system comprising:

a flight control system configured to change flight characteristics of an aircraft;

a stick controller coupled to said flight control system; where said stick controller provides control signals in response to a manipulation of a stick handle;

a plurality of orthogonal springs configured, to resist manipulation of said stick handle;

an electric servo motor at least indirectly coupled to said stick handle, said electric servo motor configured to, at least Indirectly, provide forces on said stick handle, which supplement forces applied by said plurality of orthogonal springs;

a servo amplifier, coupled to said electric servo motor, configured to provide commands to said electric servo motor in response to stick control signals;

a source of said stick handle control signals; and, a stick feedback loop configured to provide information relating to a characteristic of said stick handle.

13. A system of claim 12 wherein said characteristic of said stick handle is a position of said stick handle.

14. A system of claim 13 wherein said characteristic of said stick handle is a force applied on said stick handle.

15. A system of claim 14 wherein said characteristic of said stick handle further comprises a position of said stick handle and said electric servo motor is a stepper motor.

16. A system of claim 15 wherein said source of said stick handle control signals is a fly-by-wire system.

17. A system of claim 16 wherein said plurality of orthogonal springs is configured to provide resistive forces In the event of a failure of said electric servo motor.

18. A system of claim 17 wherein said electric servo motor is configured to replace resistive forces otherwise provided by one of said plurality of orthogonal springs when said one of said plurality of orthogonal springs fails.

* * * * *